July 14, 1925.
P. T. BREN
1,545,938
WARM WATER SUPPLY PLANT
Filed Feb. 9, 1925
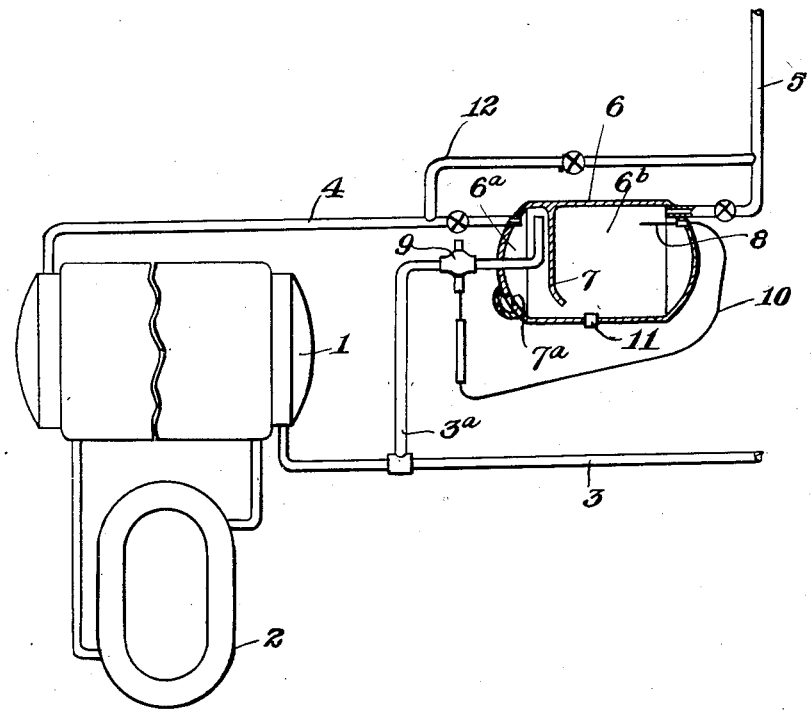
Inventor
P. T. Bren,
By Marks & Clerk
Attorneys

Patented July 14, 1925.

1,545,938

UNITED STATES PATENT OFFICE.

PEDER THULESEN BREN, OF COPENHAGEN, DENMARK.

WARM-WATER-SUPPLY PLANT.

Application filed February 9, 1925. Serial No. 8,042.

*To all whom it may concern:*

Be it known that I, PEDER THULESEN BREN, engineer, a subject of the King of Denmark, residing at 28 Svinget, Copenhagen, Denmark, have invented certain new and useful Improvements in or Relating to Warm-Water-Supply Plants, of which the following is a specification.

In warm water supply plants where the service pipe is directly connected with the water heating vessel, very hot water is drawn after periods of idleness, for instance early in the morning, while somewhat later when all the very warm water is used, the consumers will only obtain slightly cold or tepid water. These temperature swingings will not only be disagreeable for the consumers but will also in an uneconomical manner influence the furnace or boiler causing a greater use of fuel, and necessitating more attention of the workman.

For remedying this drawback it has been proposed to introduce cold water in the service pipe through a thermostatically controlled valve opening itself as soon as the temperature of the water has risen to a certain degree.

Consequently the supply of water drawn, will not as a whole be obtained from the original contents of the heating vessel but will consist partly of cold water led in through the thermostatic valve.

My invention relates to a thermostatically controlled warm water supply plant of this kind and has for its object to secure a regular mixing of the cold and warm water and further secure the calcareous deposits always formed where the cold water enters the warm water, to be deposited far from the thermostatic valve so as not to injure the function of it and to be easily removed.

According to the invention there is inserted between the service pipe and the heating vessel a container divided in two compartments or chambers, the cold water pipe and the pipe from the heating vessel being connected with the one of them, or the mixing chamber, and the service pipe with the other or the supply chamber. In the mixing chamber the cold water and the warm water are brought to flow together so as to become evenly mixed before entering the supply chamber which latter contains the heat influenced or thermostatic member for actuating the valve, the valve being placed in the cold water tube outside the container or before its connecting point with the mixing chamber.

In order that the invention may be fully understood the same is diagrammatically shown on the annexed drawing by way of an example.

The heating vessel 1 receives in the usual manner cold water from a cold water pipe 3 and owing to its connection with a boiler 2 or the like delivers warm water through a pipe 4. 5 indicates the service pipe provided with taps not shown on the drawing. Between the pipes 4 and 5 a container 6 is inserted, which by a partition 7 is divided into two chambers 6$^a$ and 6$^b$. The size of the container may for instance be equal to that of a bathing tub or even larger. Generally a capacity from 10 to 20 gallons will be sufficient. In the chamber 6$^a$ near its top the warm water pipe 4 coacts with a cold water pipe 3$^a$ in such a manner that the two flows will be immediately mixed when passing downwardly in the chamber 6$^a$, prior to passing through an aperture 7$^a$ in the bottom of the chamber 6$^a$, or beneath the partition 7 into the chamber 6$^b$.

The construction of the thermostatic valve forms no part of the present invention.

I may use any known construction comprising a thermostatic element or bulb 8 and a valve 9 connected with the feeler by a wire or tube 10 of suitable length. According to the invention the valve 9 is inserted in the tube 3$^a$ outside the mixing chamber 6$^a$, the element 8 being placed in the supply chamber 6$^b$. The thermostatic valve may be adjusted so that it is opened at about 45°.

If the water of the heating vessel 1 has a higher temperature than about 45°, the valve is opened owing to the effect of the element 8. Hence when tapping, cold water will enter the chamber 6$^a$ and mix with the warm water, thus reestablishing the temperature of 45° at which temperature the valve again closes automatically.

When introducing cold water at any point of a warm water conduit the deposits of the calcareous matters of the water are according to experiments limited to this point, while in the other parts of the conduit no sediments or incrustations appear.

Consequently in plants of the present kind, sediments or incrustations will only appear in the chamber 6$^a$, while the service pipe and the parts belonging to it, will remain clean. In order to enable the chamber 6ª to be cleaned, it may be provided with a door 10, and further the container or the chamber 6ª may be provided with a drain cock 11.

A by pass 12 enables the container to be shut out of the conduit when necessary.

I claim:—

A warm water supply plant with a thermostatically controlled cold water supply to the service pipe, comprising a container including a mixing chamber connected to the cold water supply, and a supply chamber connected to the service pipe, a warm water supply connected with the mixing chamber, the mixing chamber being provided with a cleaning aperture, and thermostatic means outside the mixing chamber for automatically controlling the cold water supply according to the temperature of the supply chamber.

In testimony whereof I hereunto affix my signature.

PEDER THULESEN BREN.